(12) United States Patent
Rasmussen

(10) Patent No.: US 9,801,259 B2
(45) Date of Patent: Oct. 24, 2017

(54) LIGHT FIXTURE WITH INFRARED LIGHT BEAM AND WITH VISIBLE LIGHT BEAM

(71) Applicant: Martin Professional ApS, Aarhus N (DK)

(72) Inventor: Niels Jorgen Rasmussen, Egaa (DK)

(73) Assignee: MARTIN PROFESSIONAL APS.

( * ) Notice: Subject to any disclaimer, the term of this patent is extended or adjusted under 35 U.S.C. 154(b) by 0 days.

(21) Appl. No.: 15/174,962

(22) Filed: Jun. 6, 2016

(65) Prior Publication Data

US 2017/0006691 A1    Jan. 5, 2017

(30) Foreign Application Priority Data

Jun. 30, 2015   (EP) .................................... 15174496

(51) Int. Cl.
| | |
|---|---|
| *H05B 37/02* | (2006.01) |
| *G09F 21/02* | (2006.01) |
| *H05B 35/00* | (2006.01) |
| *G02B 19/00* | (2006.01) |
| *G09F 19/18* | (2006.01) |

(52) U.S. Cl.
CPC ....... *H05B 37/0227* (2013.01); *G02B 19/009* (2013.01); *G02B 19/0066* (2013.01); *G02B 19/0076* (2013.01); *G09F 19/18* (2013.01); *G09F 21/02* (2013.01); *H05B 35/00* (2013.01); *H05B 37/0272* (2013.01)

(58) Field of Classification Search
CPC .. F41A 33/0216; F21S 48/1136; H05B 37/02; H05B 37/0227; H05B 37/0272; H05B 35/00; G09F 21/02; G09F 19/18; G02F 19/0066; G02F 19/0076; G02F 19/009
See application file for complete search history.

(56) References Cited

U.S. PATENT DOCUMENTS

| 8,531,308 B2 | 9/2013 | Dickie et al. |
| 2002/0196639 A1 | 12/2002 | Weidel |

(Continued)

FOREIGN PATENT DOCUMENTS

WO    2009067106 A1    5/2009

OTHER PUBLICATIONS

Extended European Search Report Application No. 15174496.8, dated Feb. 11, 2016, 7 pages.

*Primary Examiner* — Don Le
(74) *Attorney, Agent, or Firm* — Artegis Law Group, LLP

(57) ABSTRACT

The present invention relates to a light fixture comprising at least one visible light source emitting visible light, at least one IR light source emitting infrared light in an infrared spectrum, an outer housing in which the at least one visible light source and the at least one IR light source is located, a first projection system configured to collect at least some of the visible light and configured to generate at least one first light beam of the visible light along an optical axis having a first beam characteristic, a second projection system configured to collect at least some of the infrared light and configured to generate at least one second light beam of the IR light along the optical axis, wherein the second projection system is configured such that at least outside the outer housing the second beam characteristic substantially corresponds to the first beam characteristic.

18 Claims, 15 Drawing Sheets

(56) References Cited

U.S. PATENT DOCUMENTS

| | | | |
|---|---|---|---|
| 2006/0109672 A1* | 5/2006 | Sasaki | B60Q 1/10 362/514 |
| 2008/0003543 A1 | 1/2008 | Varshneya | |
| 2008/0228508 A1* | 9/2008 | Lyons | G07C 3/02 705/1.1 |
| 2010/0194595 A1* | 8/2010 | Mimeault | G08G 1/0104 340/917 |
| 2010/0264314 A1 | 10/2010 | Jalbout et al. | |

* cited by examiner

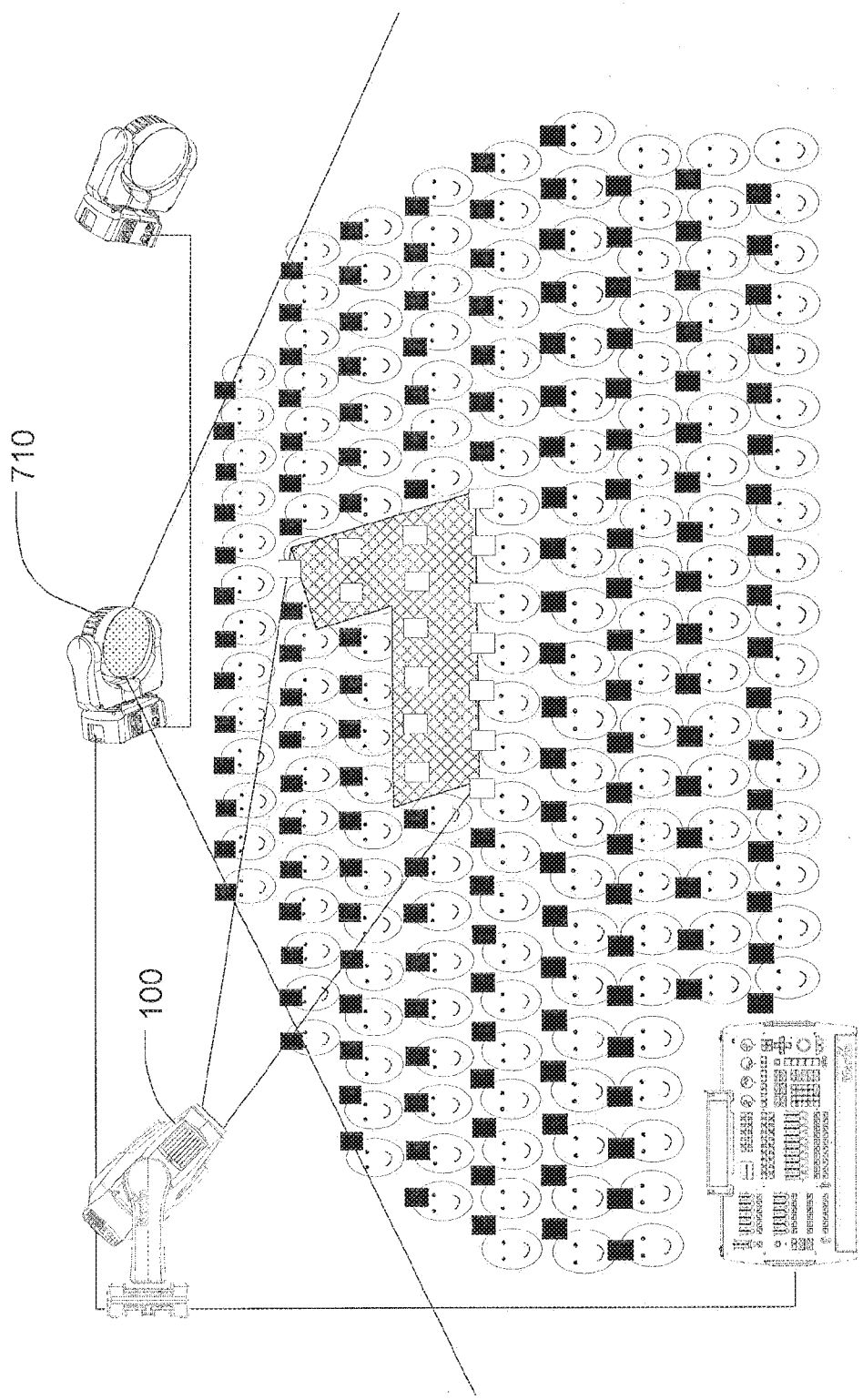

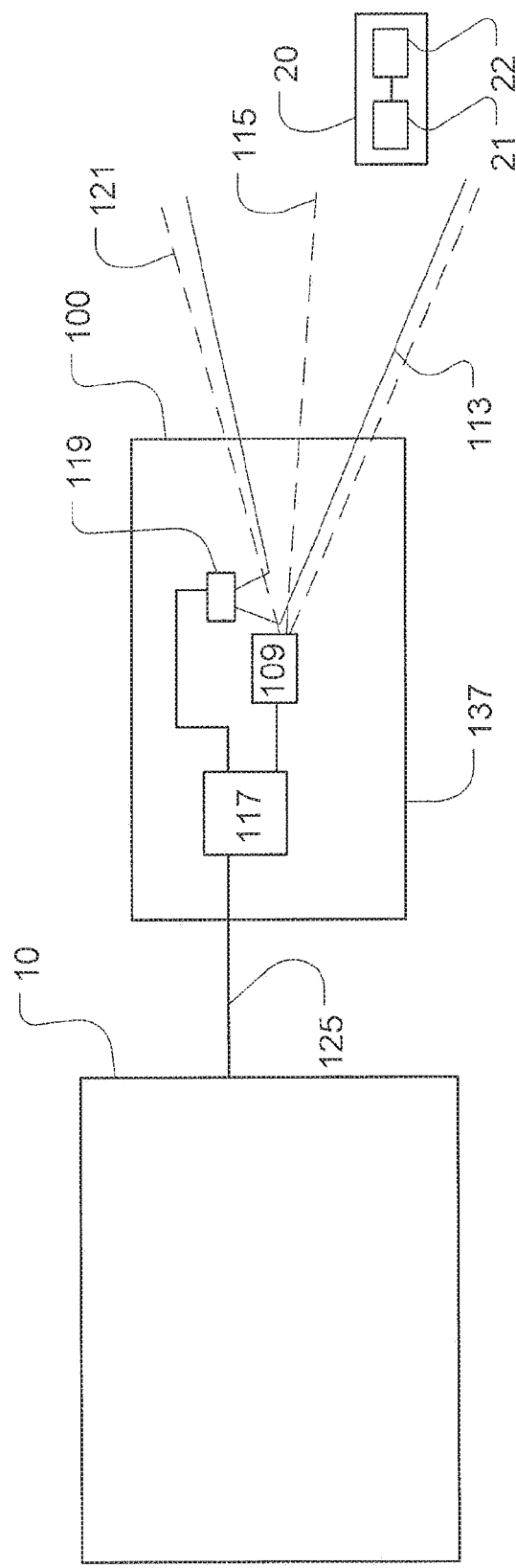

LIGHT FIXTURE WITH INFRARED LIGHT BEAM AND WITH VISIBLE LIGHT BEAM

CROSS-REFERENCE TO RELATED APPLICATIONS

This application claims priority to the European patent application titled, "LIGHT FIXTURE WITH INFRARED LIGHT BEAM AND WITH VISIBLE LIGHT BEAM," filed on Jun. 30, 2015 and having Application No. EP 15 174 496.8. The subject matter of this related application is hereby incorporated herein by reference.

TECHNICAL FIELD

Various embodiments relate to a light fixture comprising at least one visible light source emitting visible light and at least one IR light source emitting infrared light in an infrared spectrum.

BACKGROUND

For the creation of light effects in connection with concerts, live shows, TV shows, sport events, or as part of an architectural installation, light fixtures creating various light effects are used. A typical entertainment light fixture creates a light beam having a beam width and a beam divergence and can for instance be a wash or flood light fixture creating a relatively wide light beam. Another light fixture is configured to project images/patterns onto a target surface.

Light designers and programmers want as many effects as possible in a light fixture as this gives the light designer or programmer options for creation of light shows. However, it is difficult to provide light fixtures with many effects as for each light effect a component having certain space requirements has to be incorporated into the light fixture. At the same time it is desired to have light and compact light fixtures as these light fixtures are easier to handle, especially when installation is not a permanent installation but may be disassembled after use.

In the entertainment industry there is further an increasing demand for spectacular light effects and there is especially a demand for ability to activate or use the crowd attending the show for the generation of light effects. As a specific example it is known to use wristbands with an embedded LED light source that can be centrally controlled by a radiofrequency signal that is distributed to the attendees of a concert or show at the entrance. Another example is the use of smart phone apps where the user activates the app and accepts that a lighting designer takes control and uses the display as a coloured pixel. The app can be activated by Wifi or ultrasound. Even though smart phones often have location determination capabilities such as a GPS receiver, it might not be accurate and feasible when used indoor so that these apps lack the opportunity to map the position of the pixels.

Light designers are especially searching for a possibility to be able to effectively control different light sources distributed in the audience in dependence on the position of an attendee in the audience. Accordingly, a need exists to be able to generate new light effects, especially when crowd based displays are used in which a crowd of attendees having light sources such as smart phones or wristbands including light sources is present.

SUMMARY

This need is met by the features of the independent claim. Additional aspects are described in the dependent claims.

According to a first aspect, a light fixture is provided comprising at least one visible light source emitting visible light and at least one IR light source emitting infrared light in an infrared spectrum. The light fixture has an outer housing in which at least one visible light source and the at least one IR light source are located. The light fixture furthermore comprises a first projection system configured to collect at least some of the visible light and configured to generate at least one first light beam of the visible light along an optical axis having a first beam characteristic. The light fixture comprises a second projection system which is configured to collect at least some of the infrared light and is configured to generate at least one second light beam of the infrared light along the optical axis. The second projection system is configured such that at least outside the outer housing the second beam characteristic substantially corresponds to the first beam characteristic.

The light beam has a visible light beam with which a certain light effect is obtained. Additionally, the light fixture emits a light beam in the infrared spectrum wherein the beam characteristic such as e.g. the beam width and the beam divergence of the second light beam corresponds to the beam width and beam divergence of the first light beam. Thus, the visible light of the light fixture and the IR light follows substantially the same path outside the light fixture. The infrared light beam can be used to transmit information such as control information to a desired location which corresponds to the location to which the visible light is projected.

By way of example, the light fixture may comprise a control unit configured to determine a control signal to be emitted by the at least one IR light source through the second light beam, the control signal including encoded control information for controlling a light source of a receiving unit receiving infrared light beam including the control signal. According to this aspect, when the light fixture generates a light beam projected to a certain space or surface, encoded control information is at the same time transmitted to the same space or surface. The receiving units located in this space or on this surface comprising a light source can then use the encoded control information, and the light sources in the area to which the visible light and the IR light is emitted can be controlled with the encoded control information. Thus, new pixelised, i.e. exactly localised, light effects can be obtained in a crowd of attendees wearing the receiving units including the light source by directing the light fixture to the desired location or pixel.

Features mentioned above and features yet to be explained may not only be used in isolation or in combination as explicitly indicated, but also in other combinations. Features and embodiments of the present application may be combined unless explicitly mentioned otherwise.

BRIEF DESCRIPTION OF THE DRAWINGS

Further objects, advantages and features of the application will become more apparent when read in conjunction with the accompanying drawings.

FIGS. 8a to 8f illustrate different situations of the entertainment system in which the entertainment system of FIG. 7 can be used.

FIG. 11 shows a schematic view of a light system including a light fixture illustrated in one of FIGS. 1 to 6 which can generate a visible light beam and an IR light beam having the same beam characteristics.

DETAILED DESCRIPTION

Figure 1:
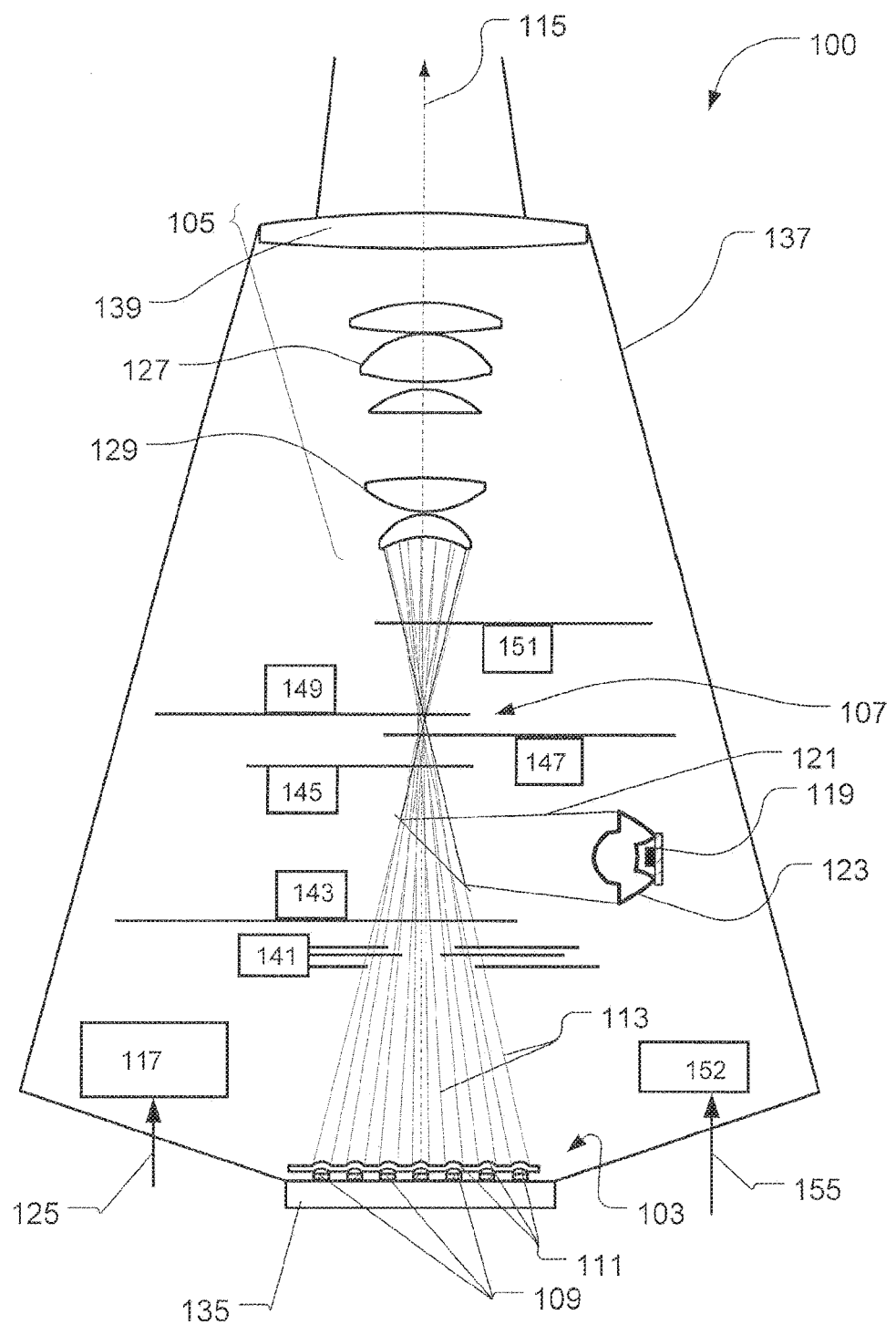
FIG. 1 illustrates a structural diagram of a light fixture generating a visible light beam and IR light beam having the same beam characteristics.

In the following, embodiments of the application will be described in detail with reference to the accompanying drawings. It is to be understood that the following description of embodiments is not to be taken in a limiting sense. The scope of the invention is not intended to be limited by the embodiments described hereinafter or by the drawings which are to be taken demonstratively only.

The drawings are to be regarded as being schematic representations, and elements illustrated in the drawings are not necessarily shown to scale. Rather, the various elements are represented such that their function and general purpose becomes apparent for a person skilled in the art. Any connection or coupling between functional blocks, devices, components or other physical or functional units shown in the drawings or described hereinafter may be implemented by an indirect and direct connection or coupling. Coupling between components or elements may be established over wireless connection or a wired connection.

Functional blocks, if provided, may be implemented in hardware, firm ware, software or combinations thereof.

FIG. 11 illustrates the schematic view of a lighting system comprising an entertainment control module 10 and a light fixture 100. As will be explained below, the light fixture 100 has both visible light sources 109 and at least one infrared light source 119 emitting infrared light in the infrared wavelength spectrum.

The light fixture 100 is designed such that a light beam 113 generated by the visible light source 109 and the light beam 121 generated by the IR light source 119 have substantially the same beam characteristics, such as beam width and beam divergence at least outside a housing 137 of the light fixture.

The entertainment control module 10 can be a light controller or can be a combined light and audio controller such as an audio mixing console including components configured to control light installations. The entertainment control module 10 can generate control signals for the light fixture 100, the control signal instructing the light fixture 100 which light effects should be generated at all time. The entertainment control module 10 can furthermore generate an encoded control signal to be output by the infrared light source 119. The light fixture comprises a control unit 117 receiving the control signals from the entertainment control module 10. The control unit 117 is configured to determine which part of the control signal is destined for the visible light source 109 and which part of the control signal is destined for the IR light source 119. Control unit 117 is configured to control components of the light fixture through a number of internal communication channels which are not shown in FIG. 11 or any other of the FIGS. 1 to 6 for the sake of clarity. The control unit comprises at least one processor (not shown) and a memory (not shown). The control unit is configured to control the components the light fixture based on a number of control parameters. The control unit can obtain the control parameters from the entertainment control module 10 or from an internal memory in form of a pre-programmed pattern/light show. The control unit can obtain the control parameters from input signal 125 wherein the input signal 125 can be any signal capable to communicate parameters and can for instance be based on one of the following protocols USITT DMX 512, USITT DMX 512 1990, USITT DMX 512-A, DMX-512-A including RDM as covered by ANSI E1.11 and ANSI E1.20 standards, Wireless DMX, Artnet or ACN (Architecture for Control Networks), ANSI E1.17, E1.31. The control parameters can be generated from input elements (not shown) implemented as part of the light fixture or implanted as part of the entertainment control module 10.

The two light beams 121 and 113 are received by a receiving unit 20 as will be explained further below in connection with FIGS. 7 to 10. The receiving units can be worn by an attendee attending a show or can be placed otherwise in a location which can be reached by the light beams 113 and 121. The receiving unit 20 comprises an IR receiver 21 configured to receive an IR control signal with encoded control information. The encoded control information is converted into control commands for light source 22 emitting visible light contained in the receiving unit. Based on the encoded control information, the light source 22 will be turned on or off in accordance with the control information contained in the IR light beam. As will be explained below, the receiving unit 20 can be part of a mobile phone or of a wristband or any other portable item to be portable by a user attending an event in which a light fixture 100 is used.

FIG. 1 illustrates a more detailed structural diagram of a projection light fixture of the light fixture of FIG. 11 as one example. The light fixture 100 comprises a light source module 103 with light sources 109 emitting light in the visible range. A projection system 105 including an optical gate 107 arranged between the light source module 103 and a front lens 139 as part of the projecting system is provided and generates the first light beams 113 of the visible light. The projection system is to further include all components which influence or amend the beam characteristics of the visible light beam, and the system 105 including inter alia a light collector 111 discussed further below. The optical gate 107 defines an area where the light source module is configured to concentrate and focus the first light beams 113. The optical gate may be indicated as an aperture, however, it should be understood that the physical aperture can be omitted in that the projection system 105 can also constitute an aperture. At least one beam shaping object as part of the projection system such as gobos, animation wheels, frost filters, framing blades, an iris, colour filters or prisms can be arranged near the optical gate 107. The fact that the beam shaping object is arranged near the optical gate means that the beam shaping object is arranged in the focal area of the light beams 113. The focal area constitutes the range along the primary optical axis 115 where the light beams are concentrated. The beam shaping object is configured to modify the light passing through the beam shaping object. The projecting system 105 comprises a number of optical components and the projecting system is configured to collect the light modified by the beam shaping object and project the light collected along the optical axis 115. The projecting system 105 can be configured to adjust the beam width and and/or the divergence of the light beam exiting the light fixture at front length 139 and can be adjusted to image a beam shaping object arranged near the optical gate at a target surface. Additionally, the projecting system can comprise a zoom group 127 and/or an optical focus group 129. The optical zoom group 127 comprises at least one optical component and is configured to adjust the divergence and the width of the first light beams 113. The optical focus group 129 comprises at least one optical component and is configured to focus the image of the beam shaping object at a target surface along the primary optical axis 115.

The projecting system 105 can also be provided with a fixed group of optical components having predefined focusing and zoom properties. The at least one optical component of the optical zoom groups 127 and/or the focus group 129 can be any optical component known in the art such as lenses, prisms, reflectors. Furthermore, it is noticed that some of the optical components may be movable in relation to the optical axis 115.

The light source module 103 comprises a plurality of light sources 109 and a plurality of light collectors 111. Each light collector is configured to collect light from at least one of the light sources 109 and to convert the collected light into the first light beam 113, the different light beams propagating along the optical axis 115 illustrated in the dashed dotted line in FIG. 1. As a consequence, a plurality of first light beams are created which propagate along the optical axis 115. The projecting system 105 including the light collectors 111, gate 107, zoom component 127, focus group 129 and front lens 139 is configured to collect the light and project the light along the optical axis 115.

In the illustrated embodiment, the light sources are LEDs (light emitting diodes), however, any kind of controllable light source can be used such as OLEDs (organic light emitting diodes), PLED (polymer LEDs), discharge lamps, incandescent lamps, plasma lamps.

The light fixture 100 comprises controller 117 configured to control the components of the light fixture as discussed in connection with FIG. 11. The control unit 117 is configured to inter alia control the position of the zoom groups along the primary optical axis. For example, the zoom group can be moved by an actuator (not shown) which is controlled by control unit 117. The focus group 129 comprises at least one optical component moving along the primary optical axis 115 in order to focus an image of the beam shaping object at a target surface. The control unit 117 is further configured to control the position of the focus group along the primary optical axis. For instance, the focus module can be moved by the actuator that is controlled by the control unit 117.

The control unit 117 can be configured to control the zoom group 127 based on a first zoom level parameter where the first zoom level parameter is indicative of the zoom level of the projected light beam. The zoom level parameter may be obtained from the memory (not shown) of the control end 117 or may be received via input signal 125 or from a user interface. The control unit can also be configured to control the focus group based on a focus parameter. The focus parameter can be indicative of a distance where the image of the beam shaping object shall be focused and may be determined based on the zoom level parameter or may indicate if a defocused image is to be provided. The control unit 117 can further be configured to determine a focus level parameter based on the zoom level parameter, e.g. in order to maintain the same focussing during a zoom operation. The optical focus group may be movable between a focusing position and a defocusing position wherein in the focusing position the optical focus group is configured to image the beam shaping object at a target surface along the optical axis 115 and in the defocusing position the optical focus group is configured to provide a defocused image of the beam shaping object. This results in a blurred image of the projective light pattern. This provides a further light effect option which can be used in connection with the different light patterns provided by controlling the different groups individually.

In the illustrated embodiment, the light sources 109 are arranged on a heat sink 135 at an end of the lamp housing 137 of the light fixture and the other components are arranged inside the housing 137. In the illustrated embodiment, the light collector 111 comprises a number of lenslets each collecting light from at least one of the LEDs and converting the light into a corresponding light beam 113. However, it is noted that the light collector 111 can also be embodied as a single optical lens, e.g. a Fresnel lens, or as a number of TIR (total internal reflections) lenses, a number of light rods or a combination thereof. It is understood that the light beams 113 propagating along the optical axis contain rays of light propagating at an angle, e.g. an angle of 45 degrees or less relative to the optical axis 115. As described previously, the projecting system 105 is configured to collect at least a part of the light beams transmitted through the optical gate 107 and to project the light along the primary optical axis in order to image the optical gate onto an object such as a screen or an area on a concert stage. A certain image, e.g. some opaque pattern provided on a transparent window, an open pattern in a non-transparent material, or imaging object such as gobos may be arranged near the optical gate.

The light fixture receives electrical power 155 from an external power supply (not shown). The electrical power is received by an internal power supply 152 which adapts and distributes electrical power through internal power lines (not shown) to the different components of the light fixture. The light of the light beams 113 can pass through a number of light effect components before exiting the front lens 139. The light effect components can for instance be a CMY colour mixing system 141, a colour filter 143, a gobo 145, animation effect 147, iris diaphragm 149, prism 151, the optical focus group 129 and the optical zoom group 127. These light effect components and the light modifying components may be arranged near the optical gate and are referred to as beam shaping objects as these light effect components typically are used to provide some beam shaping of the light beams. The projecting system 105 is configured to image the beam shaping object along the optical axis. The mentioned light effect components only serve to illustrate the principles of the light fixture for entertainment lighting and the person skilled in the art is able to construct other variations with additional or less light effect components.

The light fixture 100 comprises at least one IR light source 119 configured to emit infrared light beam 121. The IR light source 119 is arranged such that the IR light beam 121 is superimposed with light beams 113 on the path of the first light beams 113 inside housing 137. Thus, the infrared light emitted from the light fixture 100 has the same extent as the light beams 113 emitted from the light sources 109. The IR light thus creates the same light pattern as created by the light beams 113. This makes it possible to incorporate an IR control signal, an encoded control information, into the emitted light beam, and an IR receiver illuminated by the light beams will be able to decode the encoded control information. In the illustrated embodiment the IR light source is an IR LED, and an IR light collector 123 is configured to collect the IR light from the LED and convert the IR light into the IR light beam 121. The IR light source and the light collector are configured to emit the IR light towards a dichroic reflector 131 which is arranged inside the light beams 113 and angled such that the IR light beam 121 is reflected along the light beams 113 and in this way is superposed to the light beams 113. The IR light collector 123 is configured to adapt the IR light beam to have substantially the same beam width and divergence as the source light beams such that the IR light beam has substantially the same extent as the visible light beams 113. The dichroic reflector is configured to reflect the IR light whereas it transmits the light beams 113 so that the light beams 113 pass through the dichroic reflector 131. The IR light collector 123, the filter 131 are part of a projecting system configured to project the IR light onto the visible light beam in such a way that they have the same beam width and divergence at the exit. Some components of the projecting system for the visible light are also part of the projecting system for the IR light such as the zoom compound 127 or the focus group 129, as the IR beam is also influenced by these components.

It should be understood that the position of the IR light sources and the position of the visible light sources can be exchanged meaning that the IR light source 119 is provided at the location where the light sources 109 are provided whereas the visible light sources are provided at location shown in FIG. 1 where the IR light source 119 is located.

As can be deduced from FIG. 1, the two light beams 113 and 121 have a common beam path which extends from the dichroic filter 131 to a light exit opening of the housing 137.

Figure 2:
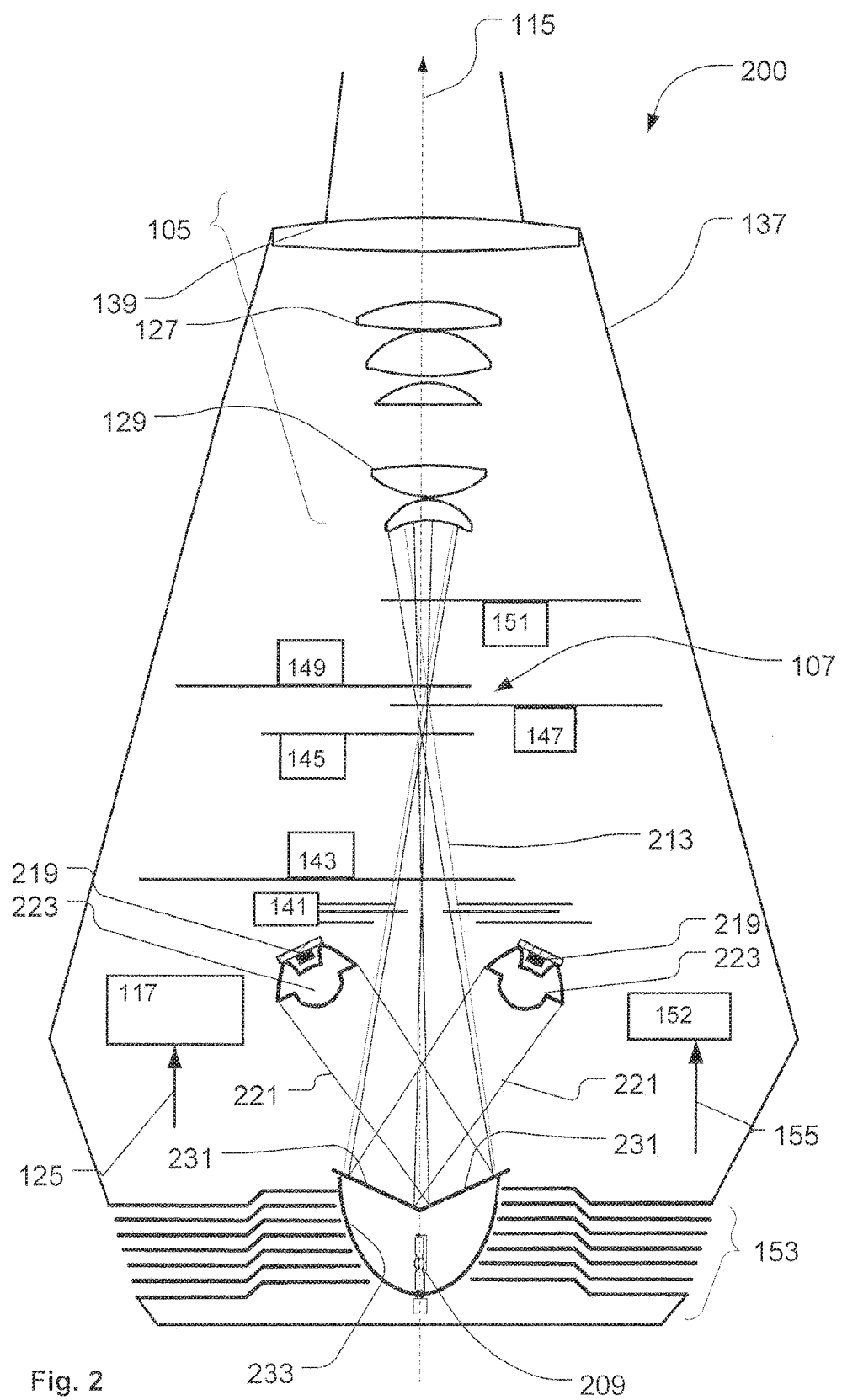
FIG. 2 shows a structural diagram of a further light fixture configured to emit a visible light beam and an IR light beam having the same beam characteristics.

FIG. 2 illustrates another embodiment of a light fixture. The light fixture 200 is similar to light fixture 100 illustrated in FIG. 1 and components labelled with the same reference numerals as in FIG. 1 describe the same components and will not be described in connection with FIG. 2.

In this embodiment the light source 209 is a discharge lamp arranged on a main reflector 233, and the main reflector 233 is adapted to reflect a part of the light generated by the light source 209 along the optical axis 115 whereby a source light beam 213 is created (illustrated by dotted lines). The source light beam 213 corresponds to the plurality of source light beams 113 described in connection with FIG. 1 and is likewise focused at an optical gate 107. A plurality of cooling fins 153 is arranged around the main reflector and serves to facilitate cooling the light source 209.

Two dichroic IR filters or reflectors 231 are arranged in the source light beam just above light source 209 and the two dichroic filters are angled in relation the optical axis 115. The two dichroic filters are configured to transmit visible light and to reflect infrared light. Due to the angling in relation to the optical axis, the two dichroic IR filters will reflect infrared light components of light source 209 towards the main reflector and thus to the cooling fins, whereby infrared light is prevented from being reflected towards the light source, whereby extra heating of the light source is avoided.

Additionally the light fixture 200 comprises two IR LEDs 219 configured to emit infrared light 221 and the IR light sources 219 are arranged such that the IR light is superposed with the source light beams. IR light collectors 223 are configured to collect the IR light from the IR LEDs and convert the collected IR light into IR light beams 221 directed to the reflectors 231. The IR light source and the TIR light collector are configured to emit the IR light towards the IR dichroic reflectors 231 and angled in relation to the IR dichroic reflectors such that the IR light beam is reflected along with the light beam 213 and is in this way superposed onto the light beam 213. The IR light collector 223 is configured to adapt the IR light beam to have substantially the same beam width and divergence as the source light beam such that the IR light beam has substantially the same extent as the source light beams. The dichroic reflectors are configured to reflect IR light and to transmit the source light beam whereby the source light beams pass through the IR dichroic reflector.

In the embodiment of FIG. 2, the first light beam, the light beam of the visible light 213 and the second light beam, the light beam of the IR light have the same beam width and beam divergence downstream of the two dichroic filters 231. Furthermore, the projecting system for the IR light beam comprises the filters 231 and the part of the projecting system of the visible light source downstream of the filters 231.

FIGS. 3 to 6 describe further embodiments incorporating IR light sources and visible light sources having common light beams at least outside the light fixture.

Figure 3:
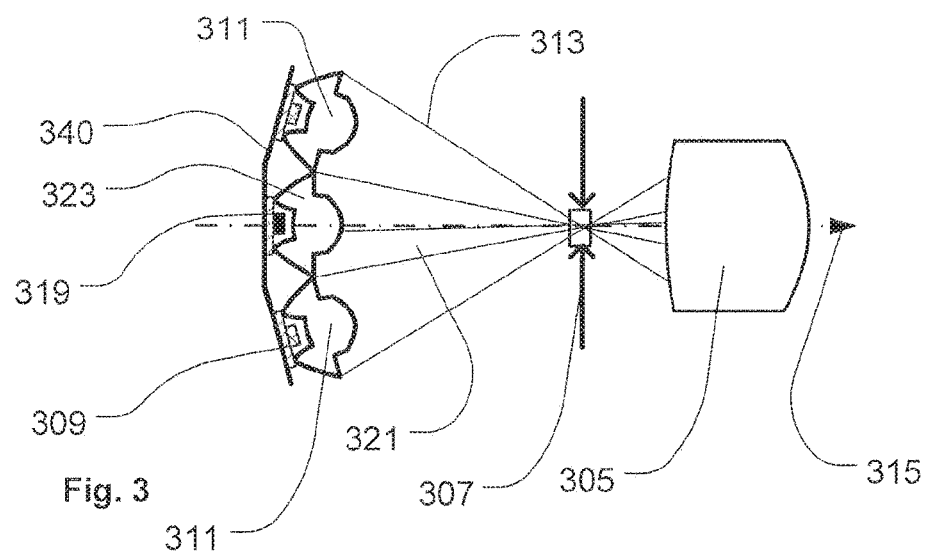
FIG. 3 illustrates a structural diagram of a further light fixture emitting a visible light beam and an IR light beam having the same beam characteristics.

In FIG. 3 a number of visible light sources 309 and light collectors 311 are configured to provide a plurality of visible or first light beams 313 which are focused in an optical gate 307. A projecting compound 305 is configured to collect light and project the light along the optical axis 315. An IR light source 319 and an IR light collector 323 are arranged adjacent the visible light sources and configured to provide the IR light beam which is focused at the optical gate 307 and has the same beam width and divergence as the visible light beams 313.

In the embodiment of FIG. 3, the visible light source and the IR light source are located on a single support plate 340. In the embodiment of FIG. 3, the part of the light beams in which the first and second light beams have the same beam characteristics is downstream of the optical gate, wherein the projecting compound 305 eliminates further minor differences existing between the first and second light beam. The projecting system for the visible light comprises the light collectors 311 and the projecting component wherein the projecting system for the IR light comprises the light collector 323 and the projecting component.

Figure 4:
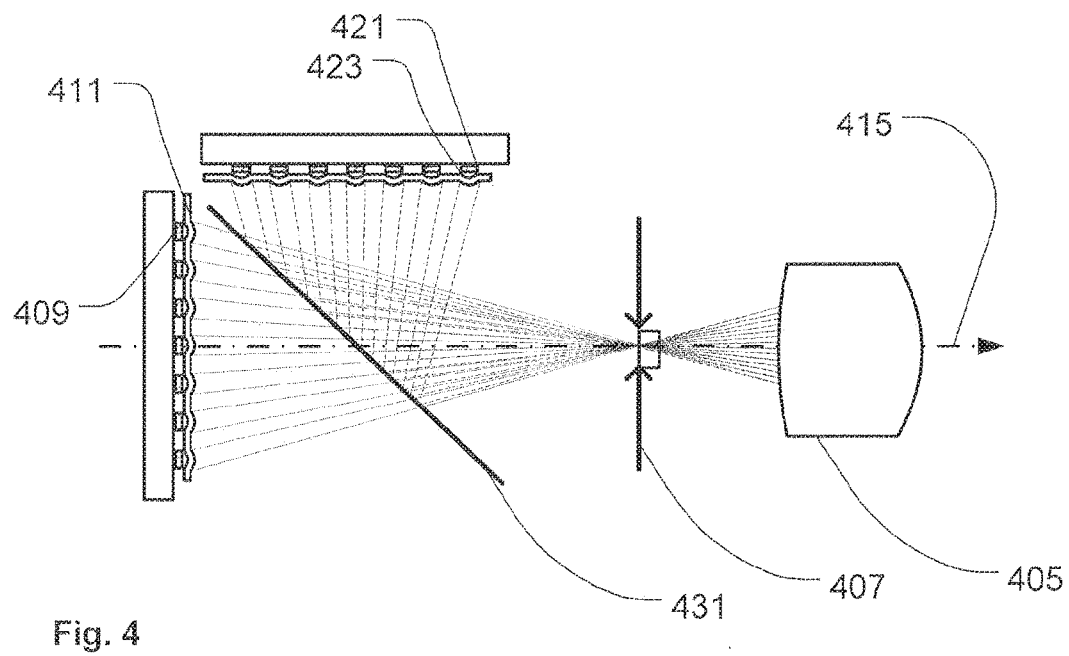
FIG. 4 illustrates a structural diagram of still another light fixture configured to generate a visible light beam and an IR light beam having the same beam characteristics.

In FIG. 4 a further embodiment is shown in which the visible light sources 409 are arranged as an array in connection with a light collector 411 in which a plurality of lenslets are provided. The visible light sources 409 and the light collectors 411 focus the visible light in the optical gate 407 and a projecting component 405 is configured to collect and project the collected light along a target surface. The IR light sources 421 are arranged in an array where the IR light collectors 423 are configured to collect the infrared light and focus the infrared light at the optical gate in a similar way as the visible light. The IR light is superposed onto the visible light at the dichroic reflector 431 configured to reflect the IR light and transmit the visible light.

In this embodiment, the common beam characteristics are obtained for the two light streams downstream of the dichroic filter 431. In this embodiment, the projecting system for the visible light comprises the light collector 411 and the projecting component 405, whereas the projecting system for the IR light sources comprises the light collector 423, the filter 431 and the projecting component 405.

Figure 5:
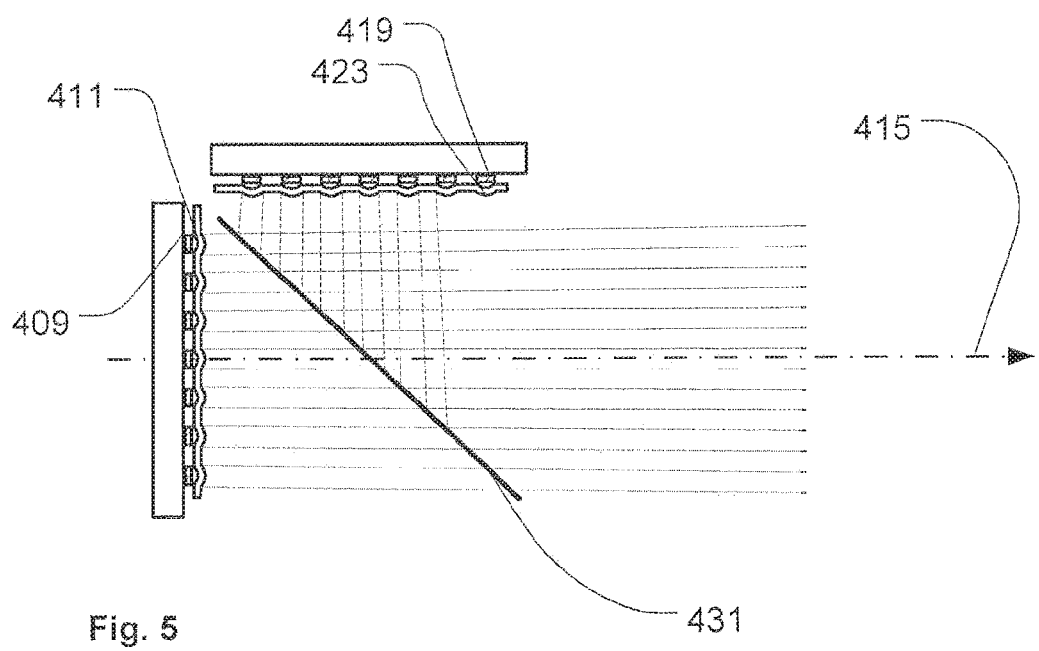
FIG. 5 illustrates a structural diagram of a further light fixture configured to emit a visible light beam and an IR light beam having the same beam characteristics.

FIG. 5 shows an embodiment similar to the embodiment shown in FIG. 4, however, the visible light beams and the IR light beams are not focused into an optical gate and are instead emitted directly along the optical axis 415.

Figure 6:
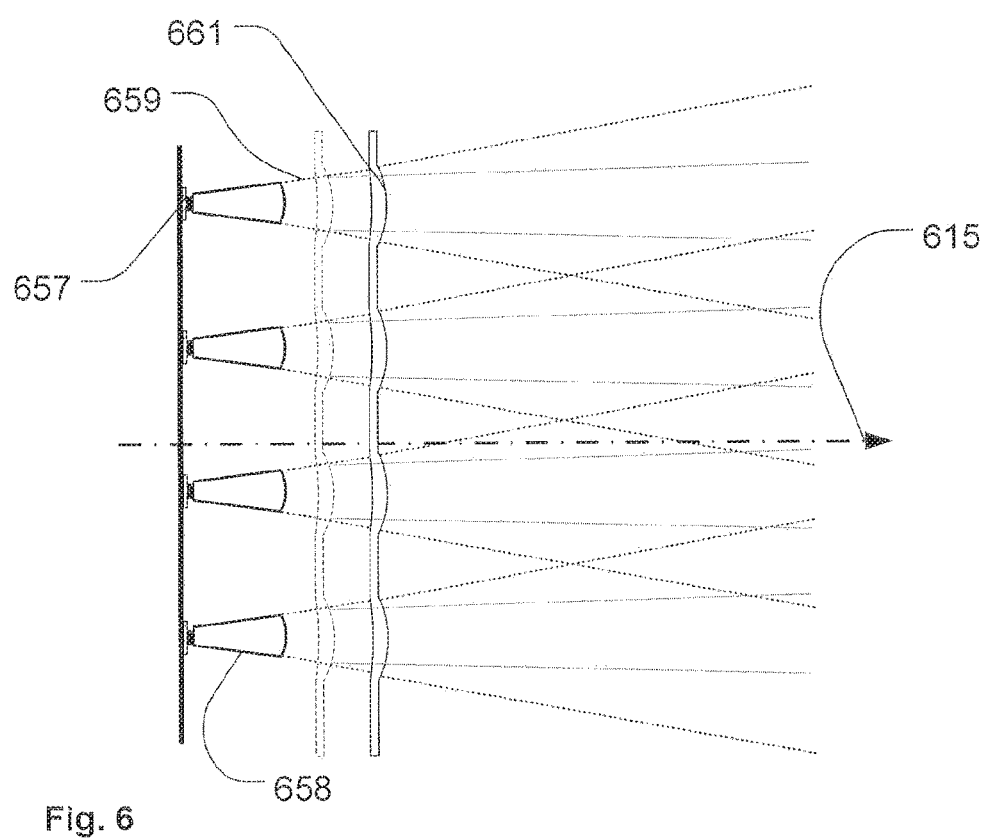
FIG. 6 illustrates a structural diagram of still another light fixture configured to emit a visible light beam and an IR light beam having the same beam characteristics.

FIG. 6 shows an embodiment where a number of multicoloured light sources 657 such as multicoloured LEDs are used. The multicoloured light sources 657 furthermore comprise the IR light sources, and the light mixing rod 658 is used above each of the light sources to both collect and mix the visible and the IR light from the different light sources in order to generate the different light beams 659. The mixed light beams 659 can be emitted directly along the optical axis 615 so that a visible light beam with the IR light beam is obtained which have the same beam width and beam divergence. A plurality of zoom lenses 661 can be provided in order to change the beam width and/or the beam divergence of the mixed light beams, e.g. by moving the zoom lenses along the optical axis.

In the embodiment of FIG. 6, the visible and the invisible light beams have the same characteristics such as beam width and beam divergence downstream of the light rod which acts as a light collecting element.

In connection with FIGS. 7 and 8, the use of the light fixture such as the light fixtures discussed above in connection with FIGS. 1 to 6 is described in more detail.

Figure 7A:
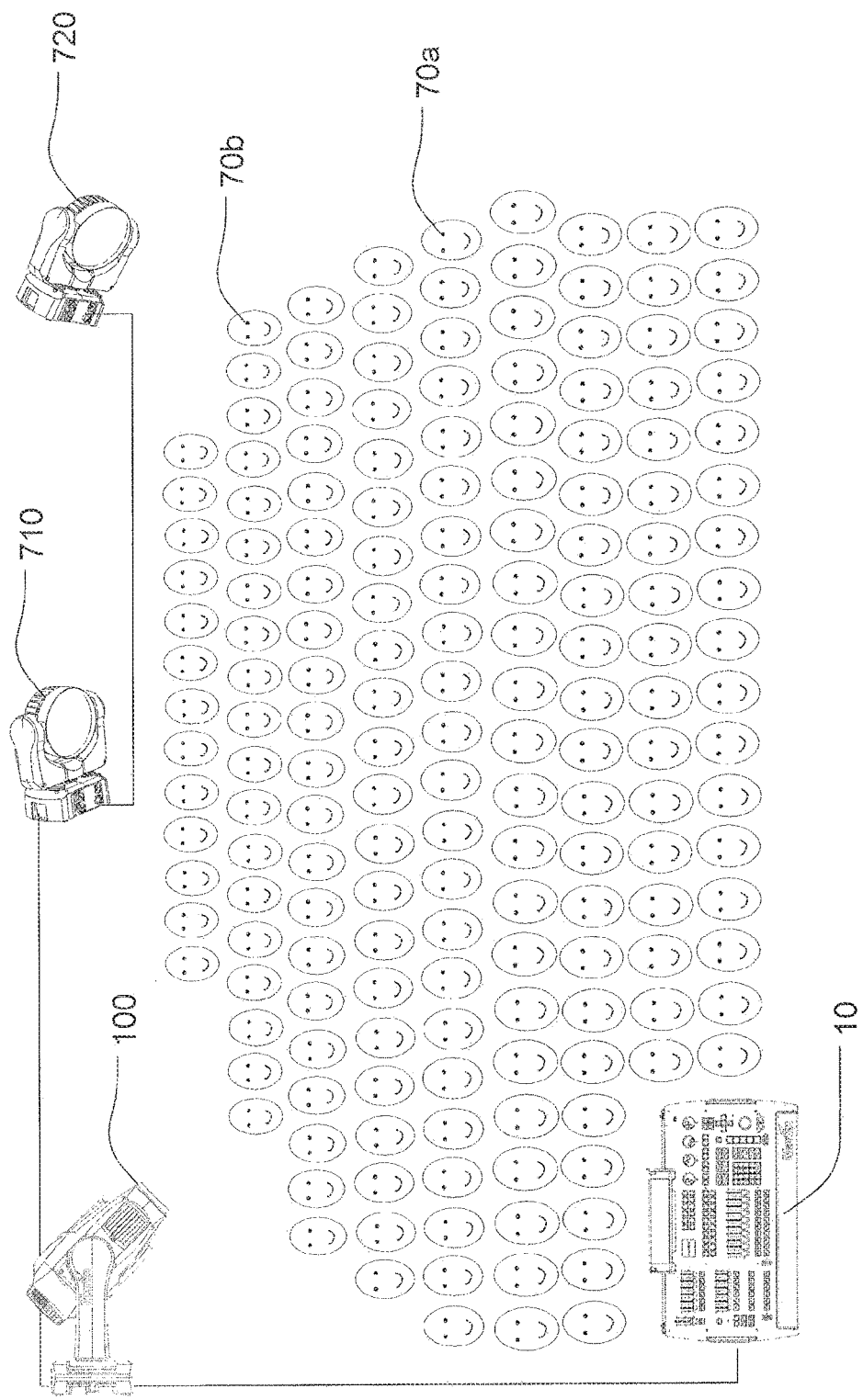
FIGS. 7a to 7b illustrate an entertainment system comprising a light fixture as illustrated in one of FIGS. 1 to 6.

FIG. 7a is a schematic view of a light system such as the light system shown in FIG. 11 as used on stage. The entertainment control module 10 is configured to generate the control signals for the light fixture such as light fixture 100. As discussed above, the fixture 100 has both IR and visible light with a common light beam. The audience to whom the light effects are presented are shown as being distributed over space at different positions. By way of example, a first attendee 70a may be located at a first position whereas a second attendee 70b may be located at another position. The system can furthermore comprise a wide angle IR beacon 710 which will be used as explained in further detail below and may comprise another light fixture 720 which can be again any of the light fixtures described above in connection with FIGS. 1 to 6. The entertainment control module can provide the control signals for the different light fixtures 100 and 720 and also for the IR beacon 710.

Figure 7B:
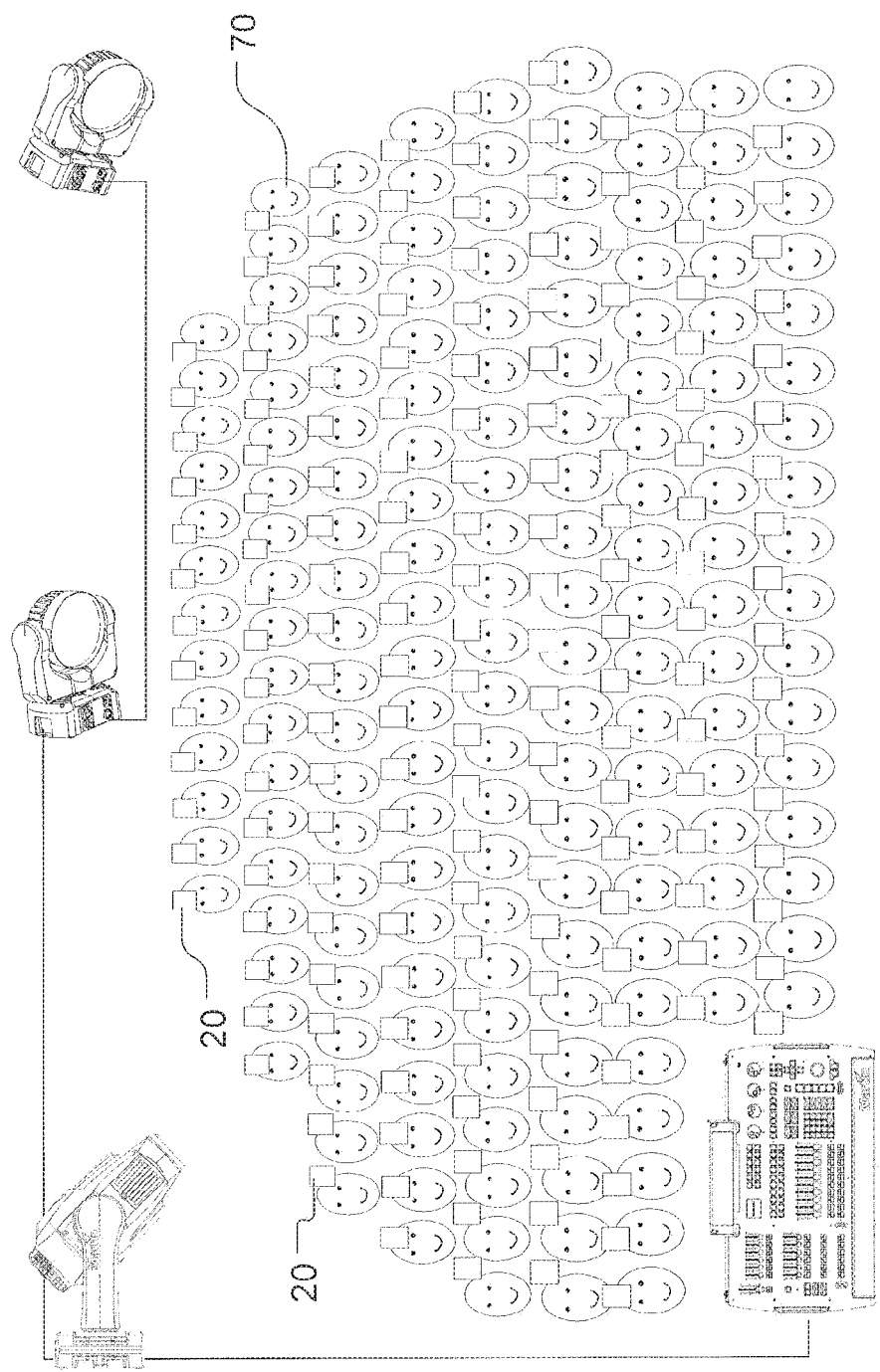

FIG. 7b shows the embodiment of FIG. 7a wherein each of the attendees 70 comprises a receiving unit 20. Each of the receiving units 20 discussed in connection with FIG. 20 can include a light source and an IR receiver configured to receive the IR beam emitted by the fixture 100 or 720. As described above, the receiving unit can be part of a mobile phone or can be incorporated into a wearable element such as a wristband, a necklace or a hat. From the light controller's point of view, the audience or the different attendees may be regarded as a matrix of pixels, each of which is able to emit light. Thus, each of the receiving units 20 is configured to emit light. The infrared light beam of the light fixture 100 or 720 can now be used to control the receiving units 20. Different embodiments of the use of the system as shown in FIG. 7 will be explained in connection with FIG. 8.

Figure 8A:
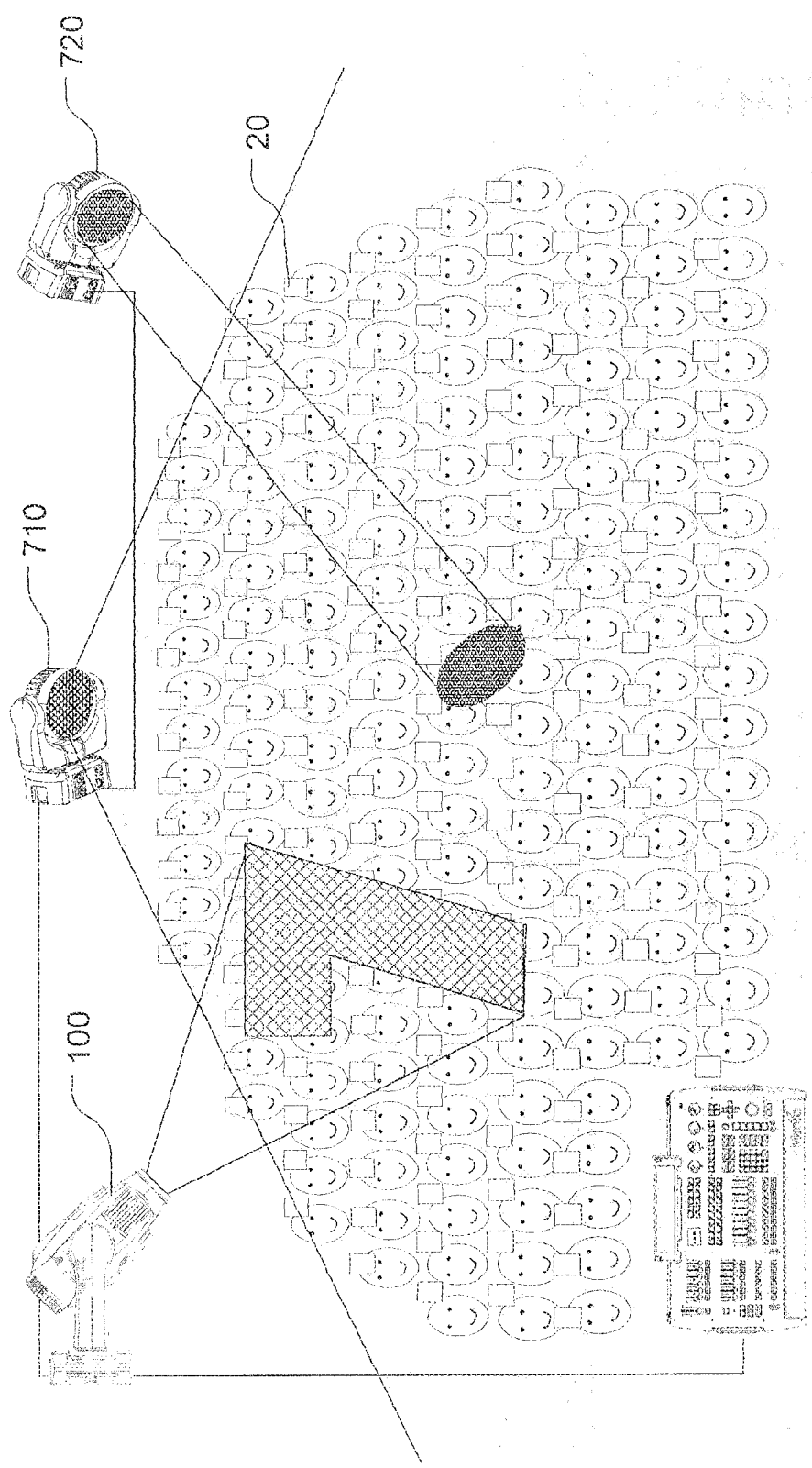
Figure 8B:
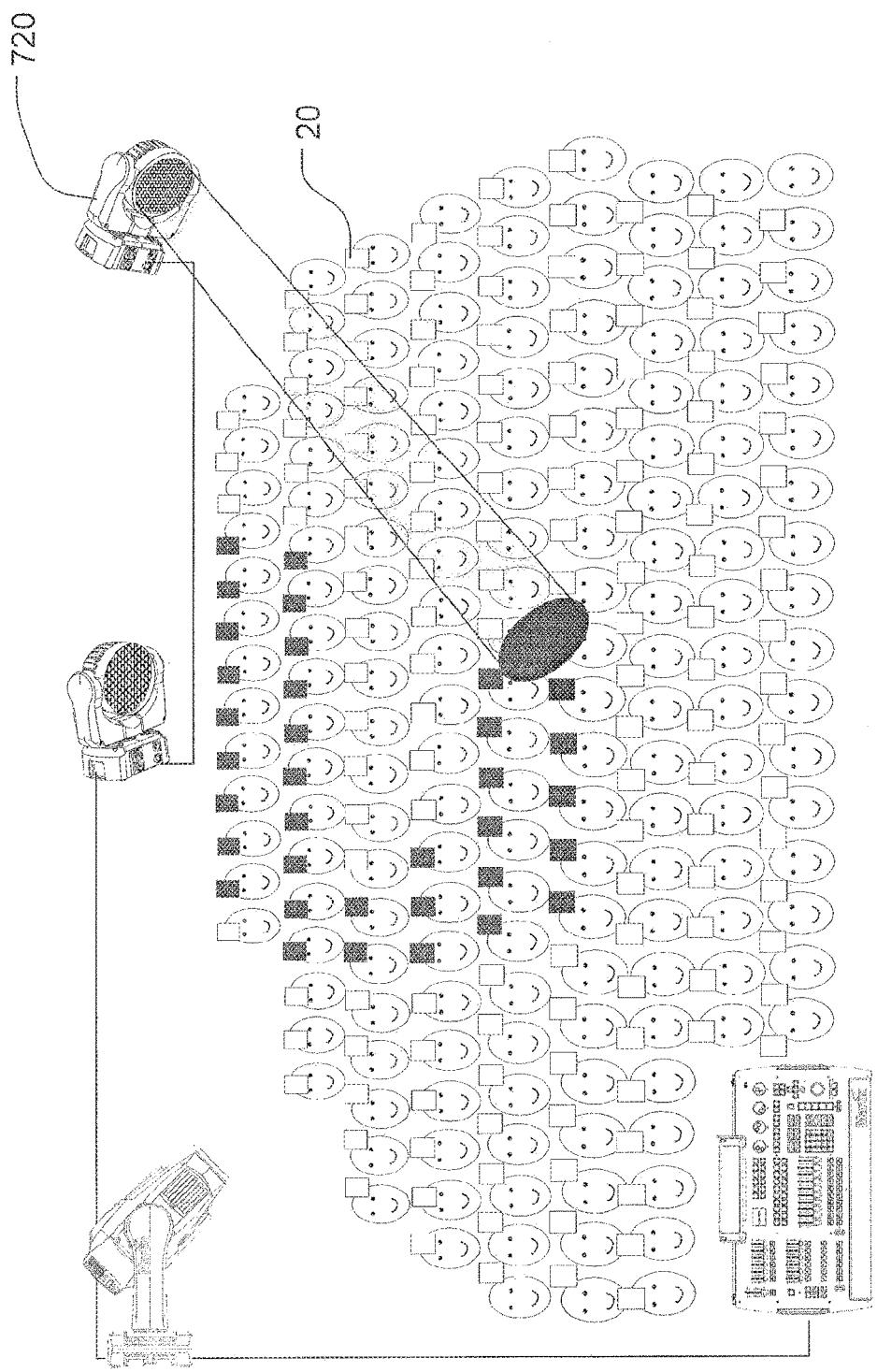
Figure 8C:
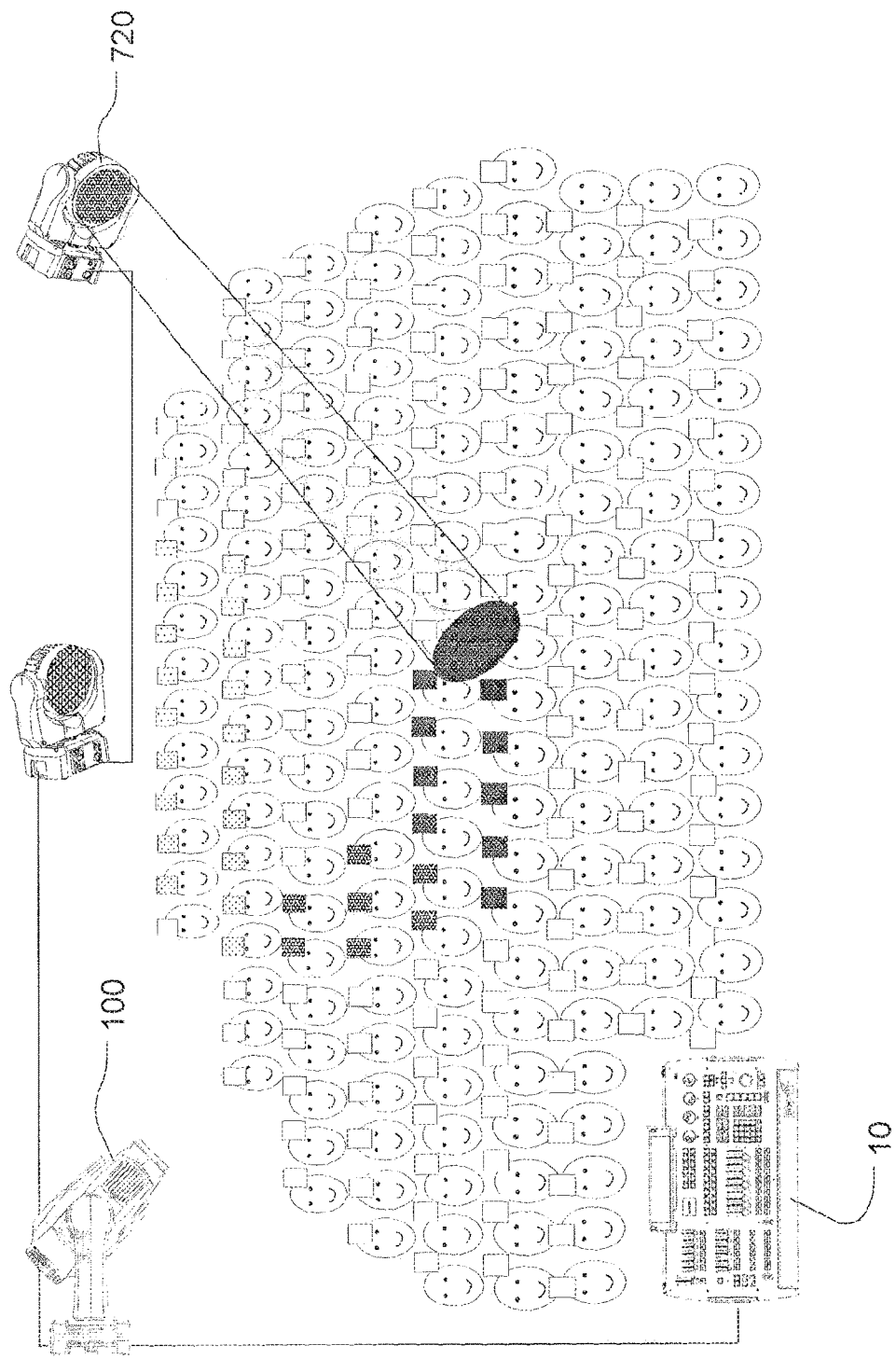

FIG. 8a shows an embodiment where the light fixture 100 is a light fixture with focusing optics for projecting a certain pattern onto the attendees, here a "7". As the same light beam is also transmitted by the IR light, the attendees covered by the displayed pattern, i.e. the attendees located at the displayed "7", receive the IR signal with the encoded control information for the different receiving units 20 shown in FIGS. 7 and 8 and covered by the visible light beam. The encoded control information can be used by the receiving unit and the light source contained in the receiving unit can be controlled using the encoded control information. The way how control information is encoded into an IR signal is known to the skilled person, e.g. from television remote controls or from any other IR remote control so that a further detailed description of how the information is encoded into the IR signal is omitted. Thus, in FIG. 8a the light effect can be obtained that all the receiving units 20 located at the location where the pattern is displayed may react by emitting a certain colour, e.g. the same colour as the projected pattern or any other colour or a sequence of colours. In the same way light fixture 720 emitting a narrow light beam including a visible light beam and an IR light beam can project the light beam onto a certain location. Thus, using the light fixture 720, a focused control of the receiving unit 20 located at the projection surface of the beam can be obtained. Thus, a "pixel-based" control of the receiving units is possible. The wide angle IR beacon can be used to control all the pixels/receiving units 20 at the same time which gives the light designer a further possibility to turn off or on all the pixels or receiving units at the same time.

The light fixture such as light fixture 100 or 720 or any of the light fixtures shown in FIGS. 1 to 6 can be of a moving head type light fixture or a scanner type light fixture. The receiving unit 20 can be a smart phone with a front or back camera without an IR filter. As light emitting element provided at the receiving unit, a wristband, a sticker, a tablet, LED video panel, a seat may be used. These elements can have an embedded IR receiver and one of several light sources. The light fixture can be a light fixture of the profile type with focusing optics for projections such as a gobo projection. Furthermore, the light fixture can be of a wash type fixture with a soft edge beam.

Figure 8D:
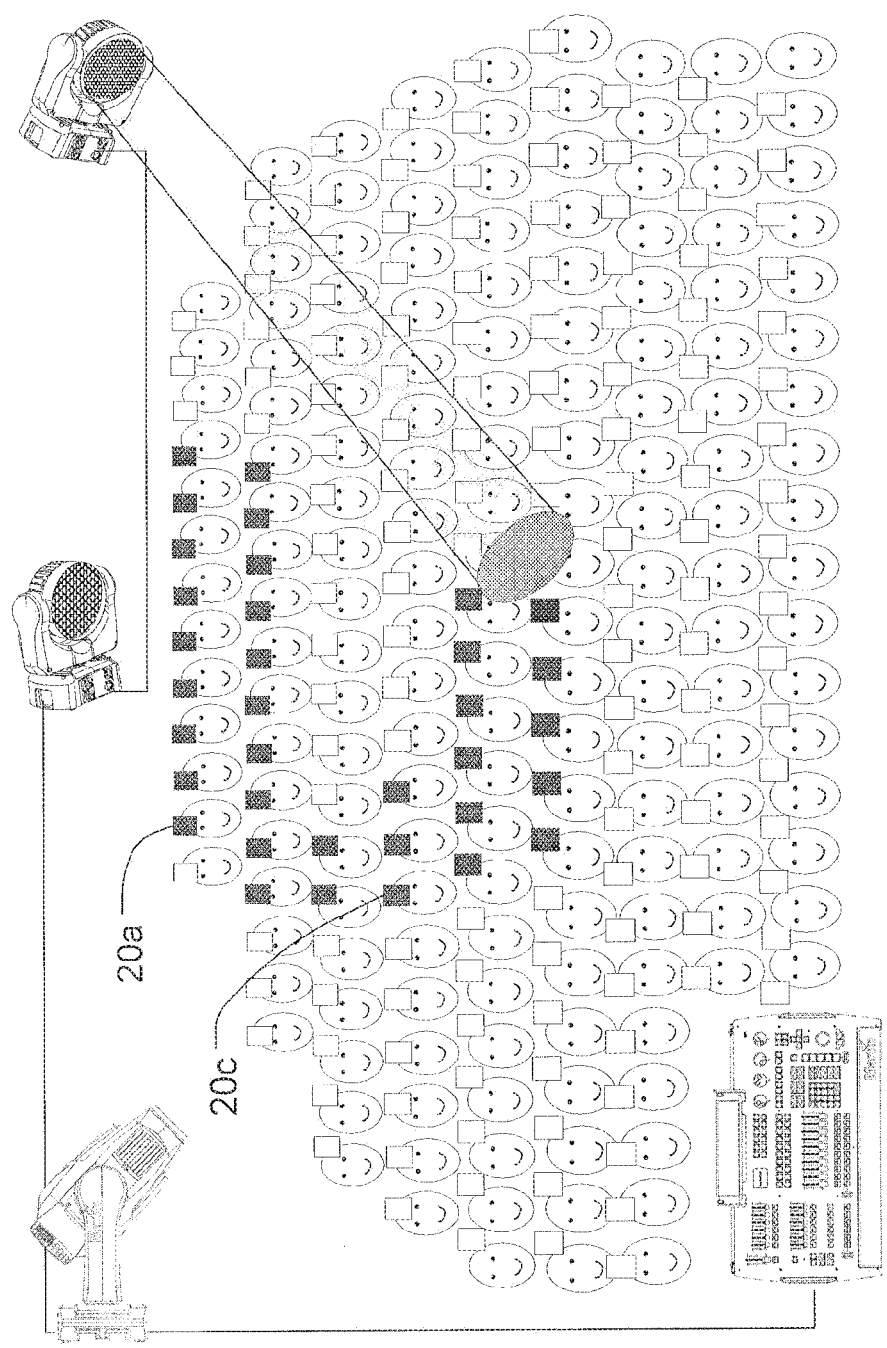
Figure 8E:
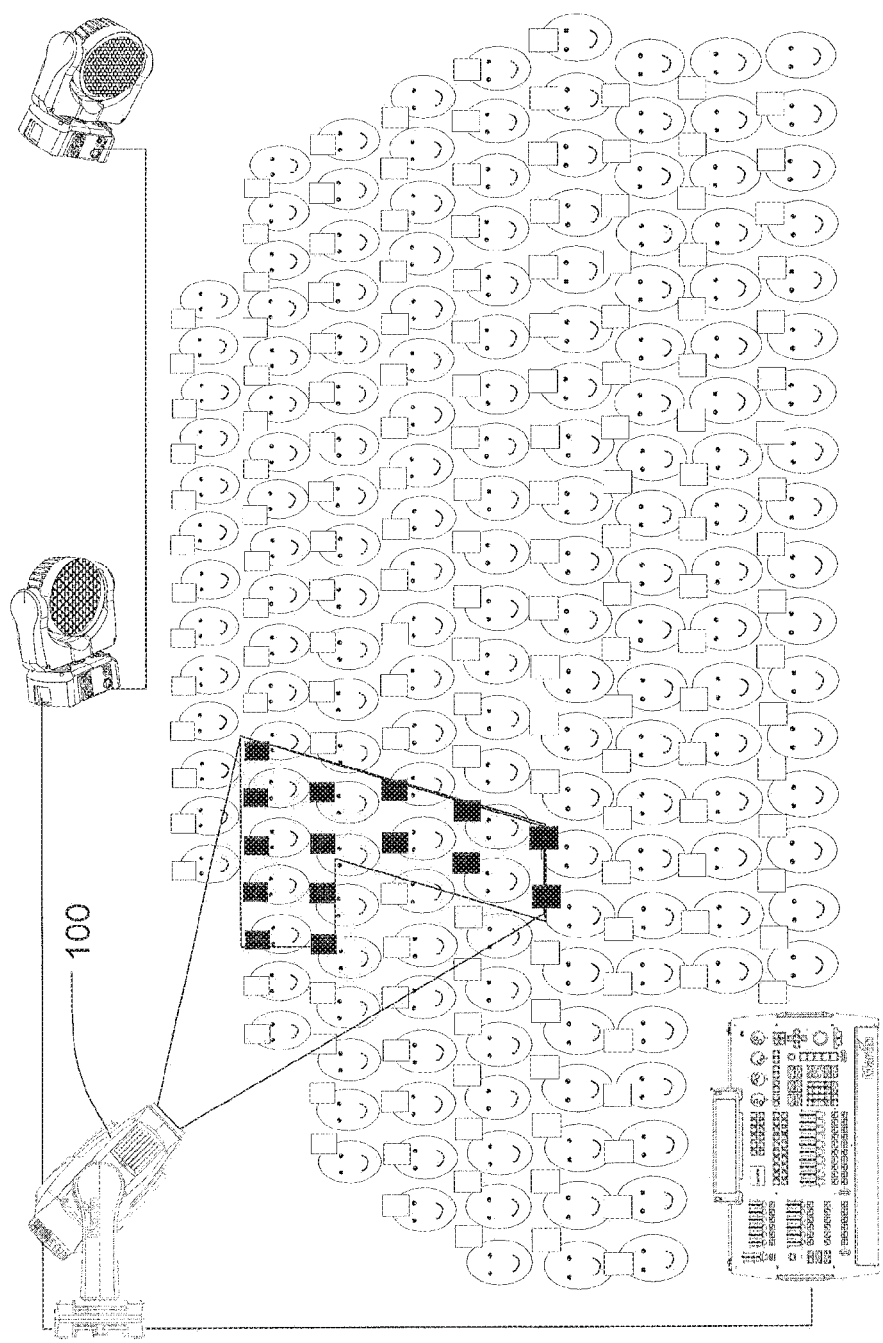

In connection with FIGS. 8b to 8f, different other embodiments are disclosed how the attending crowd can be used for generating light effects. By way of example, in the embodiment of FIG. 8b, the light fixture is moved in such a way that a beam of a certain colour, e.g. a blue beam, is drawn over the crowd. The pixels or receiving units hit by the visible light can react by depicting the light when the audience is hit by the IR beam. Thus, it is possible to monitor the path of the light beam as the receiving units receiving in the light beam will react by emitting themselves a light signal in accordance with the received encoded control information. By scanning the entire crowd using the IR light beam makes it possible to create images at the crowd as the different parts of the crowd can be assigned to emit different colours, thus different parts of the crowd constitutes pixels of the image. If the IR light beam is embodied in a moving head light fixture or a scanning mirror light fixture makea it possible to scan the crowd in a 360 degrees angel. The encoded control information can be such that the light emitted by the different receiving units 20 fade out slowly making a tail after the light beam. This is symbolised by the embodiment of FIG. 8c where the fading out is shown by the hatched structures of the pixels hit by the first light beam and hit by the second light beam. In the embodiment of FIG. 8d, the different pixels hit by the light beam of light fixture 720 can react by emitting light of different colours. By way of example, the pixels or receiving unit 20*a* in the upper row may emit light in a first colour, whereas pixels or receiving units 20*b* located at a different place may emit light in another colour. In the embodiment of FIG. 8*e*, the IR light beam in the form of a pattern controls the pixels located at the corresponding location to emit a light signal. In the embodiment of FIG. 8*e*, the first light beam with the visible light may be turned on, or in another embodiment only the IR light beam may be turned on with the visible light beam turned off so that just by controlling the light beam emitted by light fixture 100 the different pixels can be controlled as desired.

FIG. 8*f* shows an embodiment where the light IR beacon 710 controls the different pixels in such a way that all the pixels emit a light signal, while the light fixture 100 with the IR light beam controls the pixels hit by the pattern in such a way that they do not emit light and they are shut off.

As discussed above, with a light fixture having a visible light beam and an IR light beam having the same beam characteristics, different optical effects can be obtained. By way of example, when the visible light beam is turned off, the light fixture emitting the IR light beam is moved around, the crowd can be animated to emit light in accordance with the movement of the light fixture.

Figure 9:
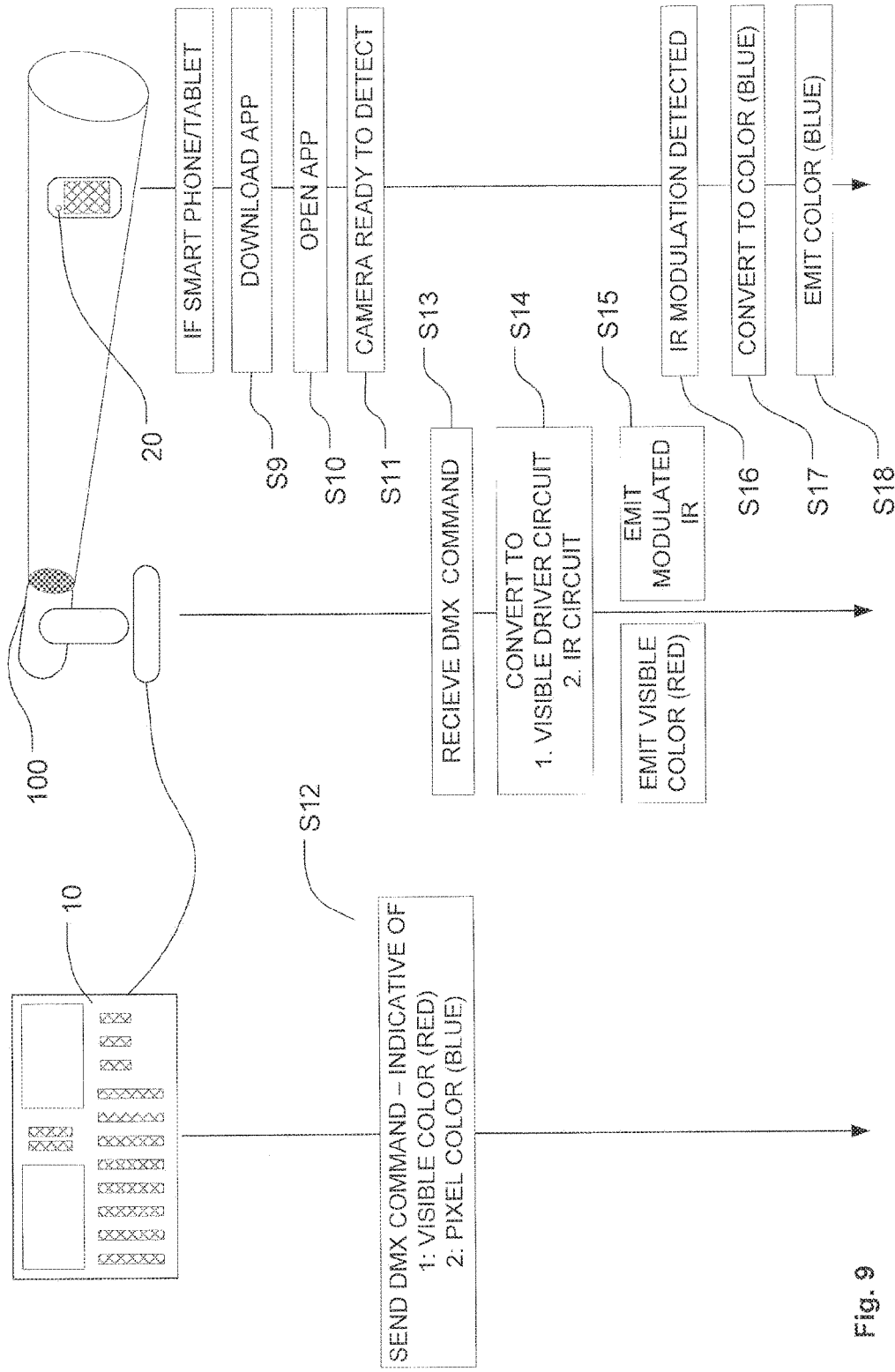
FIG. 9 shows a message flow of messages exchanged between components of the light system shown in FIGS. 7 and 8 and remote receiving units implemented as cellular phones.

FIG. 9 is a schematic view of the message flow between the different components. In an embodiment of FIG. 9, a smart phone is used as a receiving unit. If a smart phone is used in a step S9, an app may be downloaded which allows a light designer to control the light emitted by the smart phone. If the app is open in step S10, the IR camera is ready to detect at step S11.

On the side of the entertainment control module 10, a DMX command which is indicative of the visible colour and indicative of the encoded control information is generated and sent to the light fixture 100 (step S12). In step S13, the light fixture 100 receives the DMX command and converts the command into a command for the visible light and into a command for the IR light source (S14) so that in step S15 the visible colour can be emitted and the modulated IR signal including the encoded control information. In step S16, the IR modulated control information is received at the mobile phone and the control information is converted into a command for the light source of the mobile phone, e.g. the display (step S17). In step S18, the mobile phone hit by the IR light beam will then emit the light signal in accordance with the control information.

Figure 10:
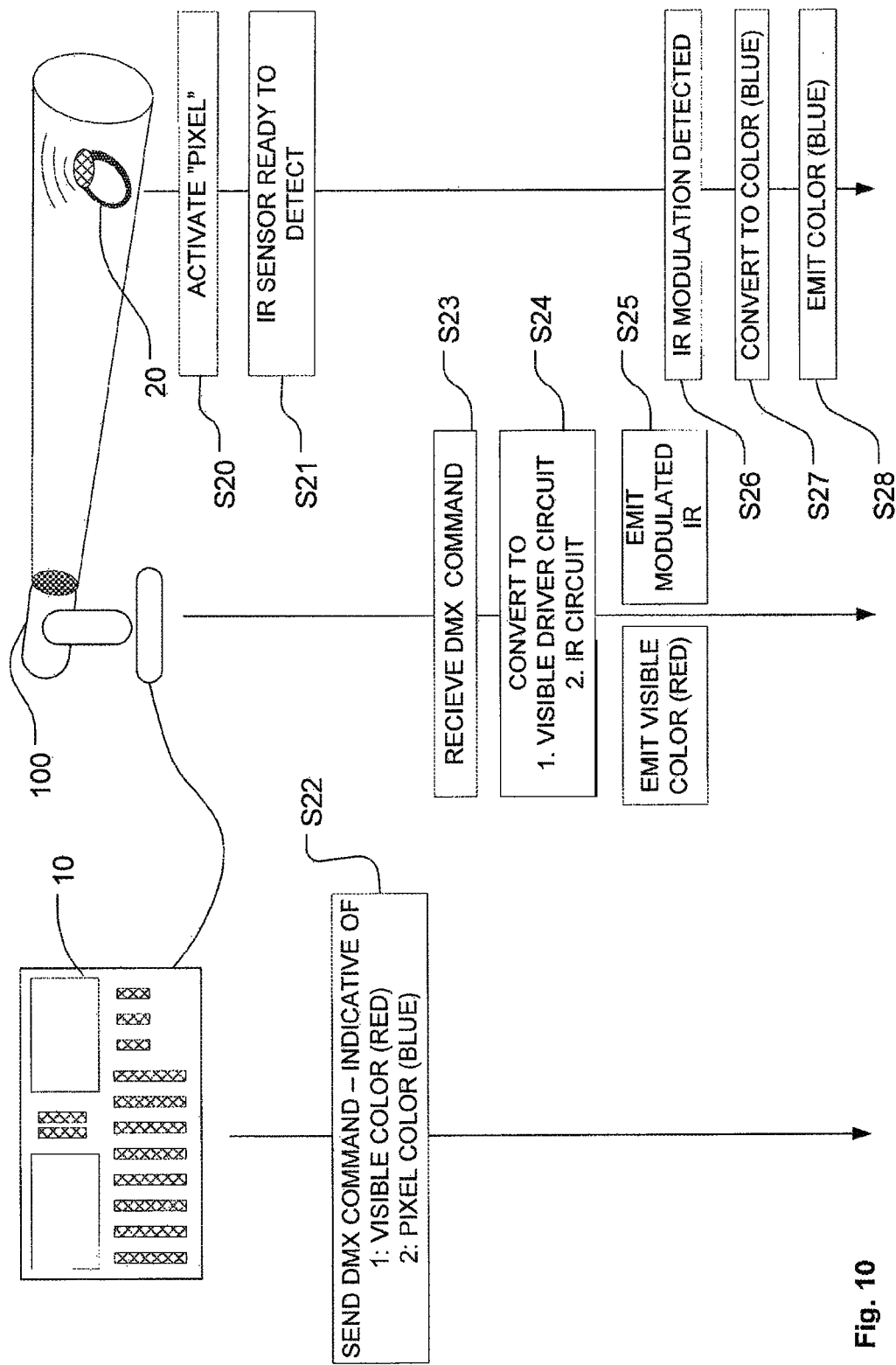
FIG. 10 illustrates another message flow of the component of the entertainment system illustrated in FIGS. 7 and 8 in which the remote receiving units are incorporated as individual pixel units.

In the embodiment of FIG. 10, a wristband is used as receiving unit. In step S20, the wristband is activated by the user so that the IR sensor present on the wristband is ready to detect IR signals in step S21. As step S12 of FIG. 9, the DMX command comprising the component for the visible light source and the IR light source is transmitted in step S22 by the control module 10. The light fixture receives the DMX command in step S23 and converts the received command into a command for the visible light source and for the IR light source in step S24 so that the light source can emit the visible light beam and the IR light beam in step S25. This light beam is then detected at the wristband in step S26, the IR beam including the encoded control information for the light source contained in the wristband. The encoded control information is converted to a colour to be emitted by the light source of the wristband in step S27 so that the colour can be finally emitted in step S28.

The claimed invention is:

1. A light fixture comprising:
   at least one visible light source emitting visible light;
   at least one infrared (IR) light source emitting infrared light in an infrared spectrum;
   an outer housing in which the at least one visible light source and the at least one IR light source are located;
   a first projection system configured to collect at least some of the visible light emitted by the at least one visible light source and configured to generate at least one first light beam of the visible light along an optical axis having a first beam characteristic;
   a second projection system configured to collect at least some of the infrared light emitted by the at least one IR light source and configured to generate at least one second light beam of the IR light along the optical axis, wherein the second projection system is configured such that, at least outside the outer housing, the second beam characteristic substantially corresponds to the first beam characteristic; and
   a control unit configured to determine a control signal to be emitted by the at least one IR light source through the second light beam, the control signal including encoded control information used for controlling a light emission of a light source of a receiving unit receiving the control signal.

2. The light fixture according to claim 1, wherein the control unit is configured to generate the control signal that includes at least one control command controlling the light emission of visible light of the light source of the receiving unit.

3. The light fixture according claim 1, further comprising a dichroic filter configured to reflect one of the infrared light and the visible light and to be transparent with respect to the other of the infrared light and the visible light, wherein the second beam characteristic substantially corresponds to the first beam characteristic in parts of the first and second light beams downstream of the dichroic filter.

4. The light fixture according to claim 1, further comprising an optical gate through which the first light beam and the second light beam pass, wherein the second beam characteristic substantially corresponds to the first beam characteristic in parts of the first and second light beams downstream of the optical gate.

5. The light fixture according to claim 4, wherein the first projecting system is configured to image a beam shaping object arranged near said optical gate at a distance along said optical axis, and wherein the second projecting system is configured to image a beam shaping object arranged near said optical gate at said distance along said optical axis, wherein the images provided by said first and second light beams are substantially identical.

6. The light fixture according claim 1, further comprising at least one light collecting element configured to collect and mix the light emitted by one or more of the at least one visible light source and by one or more of the at least one of the IR light sources, wherein the second beam characteristic substantially corresponds to the first beam characteristic in parts of the first and second light beams downstream of the at least one light collecting element.

7. The light fixture according to claim 1, further comprising a common support plate on which the at least one visible light source and the at least one IR light source are installed.

8. The light fixture according claim 1, wherein the first projection system comprises at least one of a colour mixing unit, a colour filter, a prism, and a gobo.

9. The light fixture according to claim 1, further comprising a zoom group configured to change one or more beam characteristics of the first beam and of the second beam, wherein the zoom group is located in a portion of a path of the first and second light beams where the second beam characteristic substantially corresponds to the first beam characteristic.

10. The light fixture according to claim 1, wherein the first light projection system comprises at least one first light collecting element configured to collect light from at least one visible light source and to generate at least one first light beam.

11. The light fixture according to claim 10, wherein one first light collecting element is configured to collect light from a plurality of visible light sources and to generate a plurality of first light beams.

12. The light fixture according claim 1, wherein the second light projection system comprises at least one second light collecting element configured to collect light from at least one IR light source and to generate at least one second light beam.

13. The light fixture according to claim 12, wherein one second light collecting element is configured to collect light from a plurality of IR light sources and to generate a plurality of second light beams.

14. The light fixture according to claim 12, wherein the number of second light collecting elements determines the number of second light beams.

15. A system, comprising:
a light fixture comprising:
at least one visible light source emitting visible light,
at least one infrared (IR) light source emitting infrared light in an infrared spectrum,
an outer housing in which the at least one visible light source and the at least one IR light source are located,
a first projection system configured to collect at least some of the visible light emitted by the at least one visible light source and configured to generate at least one first light beam of the visible light along an optical axis having a first beam characteristic, and
a second projection system configured to collect at least some of the infrared light emitted by the at least one IR light source and configured to generate at least one second light beam of the IR light along the optical axis, wherein the second projection system is configured such that, at least outside the outer housing, the second beam characteristic substantially corresponds to the first beam characteristic; and
a plurality of response units, wherein each response unit comprises:
at least one IR receiver configured to receive the second light beam, and
at least one light source emitting light in the visible range,
wherein light sources of the plurality of response units that are illuminated by the first and second light beams are controlled in accordance with a control signal encoded in the at least one second light beam.

16. A light fixture comprising:
at least one visible light source emitting visible light;
at least one infrared (IR) light source emitting infrared light in an infrared spectrum;
an outer housing in which the at least one visible light source and the at least one IR light source are located;
a first projection system configured to collect at least some of the visible light emitted by the at least one visible light source and configured to generate at least one first light beam of the visible light along an optical axis having a first beam characteristic;
a second projection system configured to collect at least some of the infrared light emitted by the at least one IR light source and configured to generate at least one second light beam of the IR light along the optical axis, wherein the second projection system is configured such that, at least outside the outer housing, the second beam characteristic substantially corresponds to the first beam characteristic; and
a zoom group configured to change one or more beam characteristics of the first beam and of the second beam, wherein the zoom group is located in a portion of a path of the first and second light beams where the second beam characteristic substantially corresponds to the first beam characteristic.

17. A light fixture comprising:
at least one visible light source emitting visible light;
at least one infrared (IR) light source emitting infrared light in an infrared spectrum;
an outer housing in which the at least one visible light source and the at least one IR light source are located;
a first projection system configured to collect at least some of the visible light emitted by the at least one visible light source and configured to generate at least one first light beam of the visible light along an optical axis having a first beam characteristic, wherein the first light projection system comprises at least one first light collecting element configured to collect light from a plurality of visible light sources and to generate a plurality of first light beams; and
a second projection system configured to collect at least some of the infrared light emitted by the at least one IR light source and configured to generate at least one second light beam of the IR light along the optical axis, wherein the second projection system is configured such that, at least outside the outer housing, the second beam characteristic substantially corresponds to the first beam characteristic.

18. A light fixture comprising:
at least one visible light source emitting visible light;
at least one infrared (IR) light source emitting infrared light in an infrared spectrum;
an outer housing in which the at least one visible light source and the at least one IR light source are located;
a first projection system configured to collect at least some of the visible light emitted by the at least one visible light source and configured to generate at least one first light beam of the visible light along an optical axis having a first beam characteristic; and
a second projection system configured to collect at least some of the infrared light emitted by the at least one IR light source and configured to generate at least one second light beam of the IR light along the optical axis, wherein the second projection system is configured such that, at least outside the outer housing, the second beam characteristic substantially corresponds to the first beam characteristic, wherein the second light projection system comprises at least one first light collecting element configured to collect light from a plurality of IR light sources and to generate a plurality of second light beams.

* * * * *